US009971171B1

(12) United States Patent
Lin

(10) Patent No.: US 9,971,171 B1
(45) Date of Patent: *May 15, 2018

(54) BATTERY ASSEMBLY FOR A WEARABLE ELECTRONIC DEVICE

(71) Applicant: Snap Inc., Venice, CA (US)

(72) Inventor: Jun Lin, Culver City, CA (US)

(73) Assignee: Snap Inc., Venice, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/672,028

(22) Filed: Aug. 8, 2017

Related U.S. Application Data

(63) Continuation of application No. 14/928,458, filed on Oct. 30, 2015, now Pat. No. 9,759,933.

(51) Int. Cl.
*G02C 1/00* (2006.01)
*G02C 11/00* (2006.01)
(Continued)

(52) U.S. Cl.
CPC .............. *G02C 11/10* (2013.01); *G02C 5/008* (2013.01); *G02C 5/146* (2013.01); *H01M 2/1022* (2013.01); *H01M 2220/30* (2013.01)

(58) Field of Classification Search
CPC . G02C 11/10; G02C 5/22; G02C 7/00; G02C 7/083; G02C 9/02
(Continued)

(56) References Cited

U.S. PATENT DOCUMENTS

| 4,283,127 A * | 8/1981 | Rosenwinkel | ......... G02C 11/04 |
| | | | 2/426 |
| 4,904,078 A * | 2/1990 | Gorike | ................... G02C 11/06 |
| | | | 351/158 |

(Continued)

FOREIGN PATENT DOCUMENTS

CA 2887596 A1 7/2015

OTHER PUBLICATIONS

"U.S. Appl. No. 14/928,458, Non Final Office Action dated Oct. 11, 2016", 7 pgs.

(Continued)

*Primary Examiner* — Hung Dang
(74) *Attorney, Agent, or Firm* — Schwegman Lundberg & Woessner, P.A.

(57) ABSTRACT

Apparatuses, systems and methods for electronic wearable devices such as smart glasses are described. According to one embodiment, a temple assembly forming part of the smart glasses is disclosed. The assembly can include a temple mechanical connection, a battery carrier, a battery, and a temple body. The temple mechanical connection is configured to form an articulated joint at a first longitudinal end portion thereof with a frame of the wearable electronic glasses. The battery carrier is rigidly attached to the temple mechanical connection at a second longitudinal end portion thereof. The battery is mounted on the battery carrier. The temple body comprises a plastics material, and is configured to house the battery and battery carrier and interface with the second longitudinal end portion of the temple mechanical connection. The battery and battery carrier are generally longitudinally aligned along a longitudinal extent of the temple body, and are configured to form at least part of a structural framework for the temple body.

20 Claims, 8 Drawing Sheets

(51) Int. Cl.
*G02C 5/00* (2006.01)
*H01M 2/10* (2006.01)
*G02C 5/14* (2006.01)

(58) Field of Classification Search
USPC .............................. 351/158, 41, 153; 16/228
See application file for complete search history.

(56) References Cited

U.S. PATENT DOCUMENTS

| | | | |
|---|---|---|---|
| 6,038,295 A | 3/2000 | Mattes | |
| 6,769,767 B2 * | 8/2004 | Swab | G02C 11/10 351/158 |
| 6,980,909 B2 | 12/2005 | Root et al. | |
| 7,173,651 B1 | 2/2007 | Knowles | |
| 7,411,493 B2 | 8/2008 | Smith | |
| 7,535,890 B2 | 5/2009 | Rojas | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,718,333 B2 | 5/2014 | Wolf et al. | |
| 8,724,622 B2 | 5/2014 | Rojas | |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,759,933 B1 * | 9/2017 | Lin | G02C 11/10 |
| 2008/0100792 A1 * | 5/2008 | Blum | G02C 5/143 351/44 |
| 2009/0002626 A1 * | 1/2009 | Wakabayashi | G02C 11/06 351/116 |
| 2009/0251660 A1 | 10/2009 | Figler et al. | |
| 2011/0202598 A1 | 8/2011 | Evans et al. | |
| 2012/0209924 A1 | 8/2012 | Evans et al. | |
| 2015/0326965 A1 | 11/2015 | Sprague et al. | |

OTHER PUBLICATIONS

"U.S. Appl. No. 14/928,458, Notice of Allowance dated May 16, 2017", 11 pgs.

"U.S. Appl. No. 14/928,458, filed Jan. 10, 2017 to Non Final Office Action dated Oct. 11, 2017", 7 pgs.

Leyden, John, "This SMS will self-destruct in 40 seconds", [Online]. Retrieved from the Internet: <URL: http://www.theregister.co.uk/2005/12/12/stealthtext/. (Dec. 12, 2005). 1 pg.

* cited by examiner

BATTERY ASSEMBLY FOR A WEARABLE ELECTRONIC DEVICE

PRIORITY CLAIM

This application claims the benefit of priority of U.S. patent application Ser. No. 14/923,458; filed on Oct. 30, 2015, now U.S. Pat. No. 9,759,933, which is hereby incorporated by reference herein in its entirety

TECHNICAL FIELD

The subject matter disclosed herein generally relates to housing a battery. More specifically, the present disclosure discloses apparatuses, systems, methods and techniques used to house a battery within another device.

BACKGROUND

Many devices, including wearable devices, utilize a battery to supply charge to electronics. Many of these devices can have usability, space or process constraints that can limit the type, size, or location of the battery used therewith.

BRIEF DESCRIPTION OF THE DRAWINGS

The present disclosure is illustrated by way of example, and not by way of limitation, in the figures of the accompanying drawings, in which.

OVERVIEW

A brief overview of some aspects of the disclosure with reference to selected drawings follows, after which various features of the disclosed subject matter will be described in greater detail.

Figure 1:
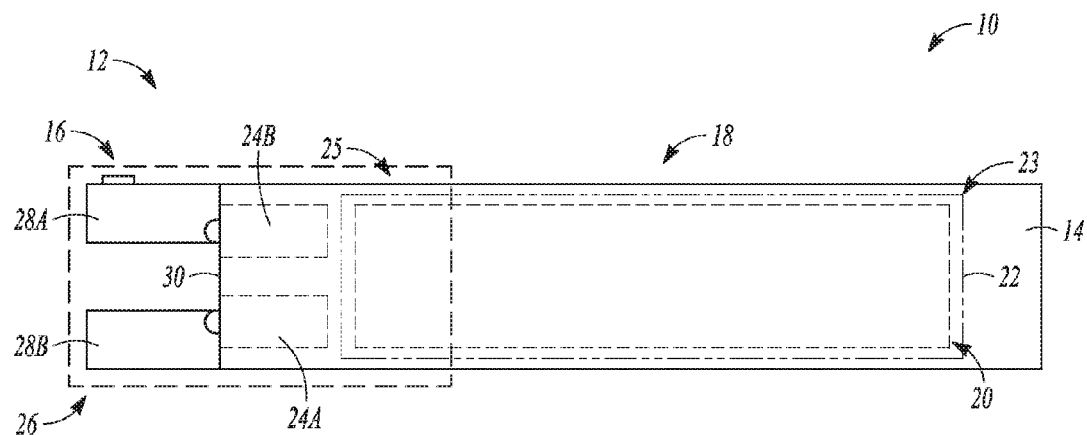
FIG. 1 is a plan view of a portion of eyewear carrying a battery according to one embodiment.
Figure 1A:
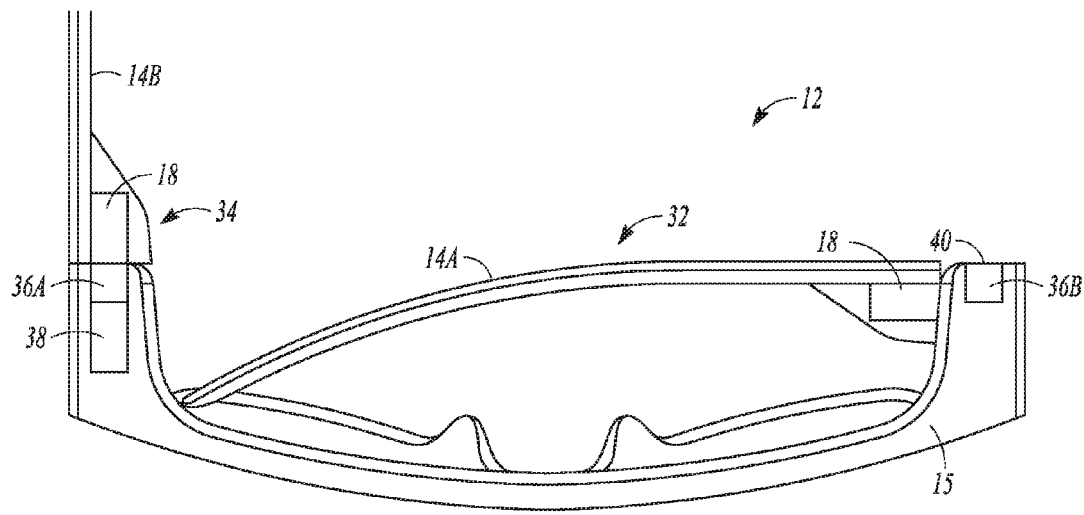
FIG. 1A shows a plan view of the eyewear comprising a temple and a frame according to one embodiment.

One aspect of this disclosure relates to a wearable device such as an eyewear article with onboard electronics such as a battery as is shown in FIGS. 1 and 1A. As such, the eyewear article comprises smart glasses. The battery can power other onboard electronics carried by the smart glasses. The present inventor has recognized that it can be difficult to fit a suitable battery into smart glasses due to size, material and process constraints. For example, many conventional eyewear (and indeed smart glasses) are typically formed of acetate or similar cellulosic materials that do not have particularly great structural integrity, and therefore, include a wire backbone for reinforcement. Techniques used to form conventional eyewear may not translate desirably to the fabrication of smart glasses. For example, size constraints may dictate that the wire backbone may not be used in a temple that also houses a battery. Smart glasses can be difficult to form into a desired shape and weight while maintaining sufficient structural integrity and size to adequately house the battery. Thus, the current inventor proposes, among other solutions, utilizing a battery carrier to house the battery (e.g., FIGS. 1, 2A, 3A) and additionally act to provide structural integrity to the temple so the temple can more reliably bear mechanical load. An articulated joint (e.g., a hinge assembly) between portions of the smart glasses (e.g., the temple and a frame) can be rigidly mechanically connected to the battery carrier to facilitate more desirable force distribution and transfer to the temple. Further, the inventor recognizes process constraints that limit effective housing of the battery in the smart glasses can be overcome by splitting the temple into a base and cover (e.g., FIGS. 2A and 2B) and/or by molding the temple about the battery and battery carrier (e.g., FIGS. 3A and 3B) rather than by employing traditional fabrication techniques from the eyewear industry. The inventor also proposes further techniques that can be used to provide for rigid mechanical connection of the battery carrier to the temple (e.g., FIG. 4), provide for electrical insulation of the battery, and fix the position of the battery within the battery carrier (and fix the position of the battery carrier within the temple). Indeed, the fixation techniques disclosed in reference to FIG. 4 have broad applicability to many devices where minimizing form factor is desirable.

Figure 5A:
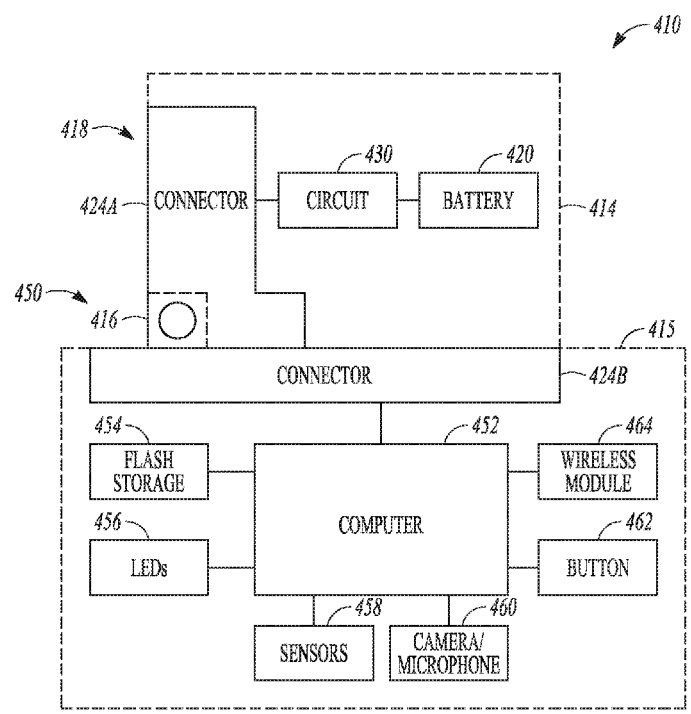
FIG. 5A is a schematic view of eyewear comprising smart glasses with electronics carried by a temple and a frame, the temple positioned in a collapsed position relative to the frame according to an example embodiment.

Another aspect of the disclosure relates to the positioning of an electronic connector (e.g., an interface or port) that allows power from the battery in the temple to be provided to the onboard electronics in the frame when the temple is in a wearable configuration (e.g., FIG. 5B) and when the eyewear article is in a folded or collapsed configuration (e.g., FIG. 5A). Such configuration allows the onboard electronics to be supplied with power in either the wearable configuration or the collapsed configuration. This allows the smart glasses to be operable even in the collapsed configuration such as to run software and perform other tasks that can improve efficient and performance thereby improving the user experience.

Figure 5B:
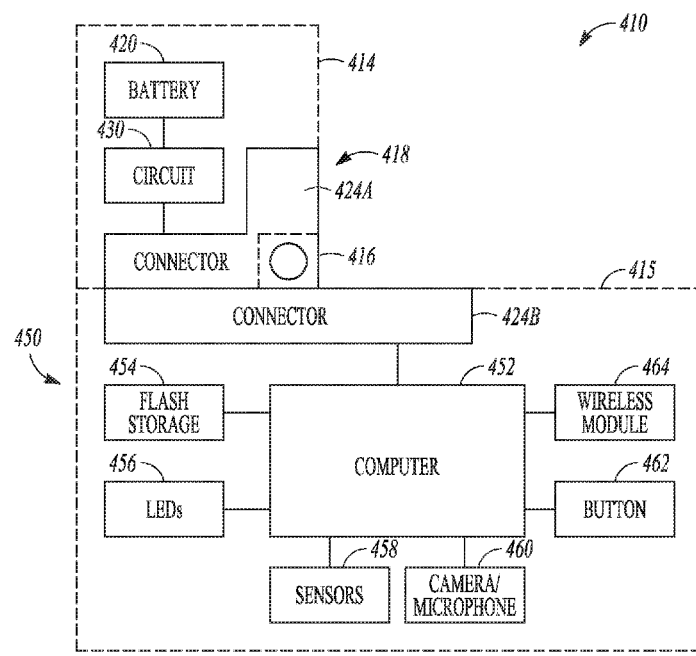
FIG. 5B is a schematic view of the smart glasses of FIG. 4A with the temple moved to a wearable position relative to the frame according to an example embodiment.

In some embodiments, electrical/electronic components may be carried both by the frame and at least one of the temples (e.g., FIGS. 5A and 5B). In other embodiments, the battery will be carried by one or both of the temples while substantially all other electrical/electronic components (see, e.g., computer, sensors, camera, microphone, wireless module, and the like, of FIGS. 1, 5A, and 5B) are carried only by the frame. This allows for a slimmer frame that can be more desirable for the user to wear and easier for the user to transport.

Figure 6A:
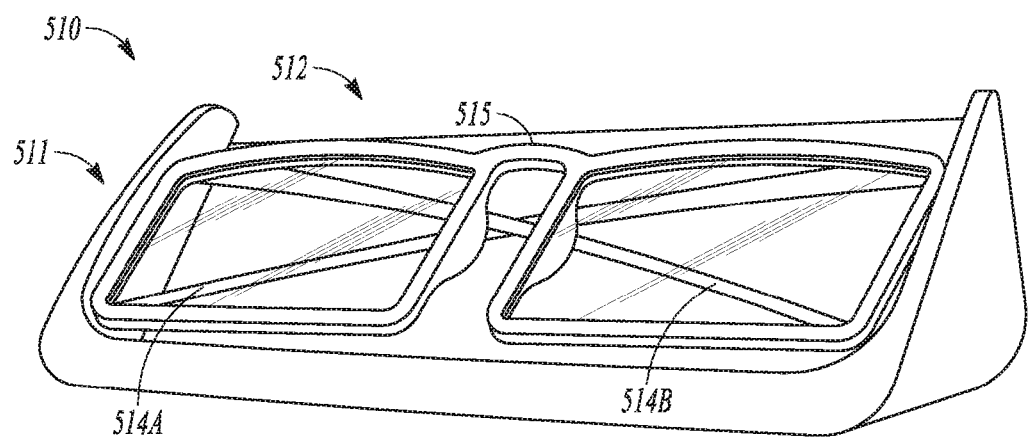
FIG. 6A is perspective view of a system including smart glasses and a case according to an example embodiment.
Figure 6B:
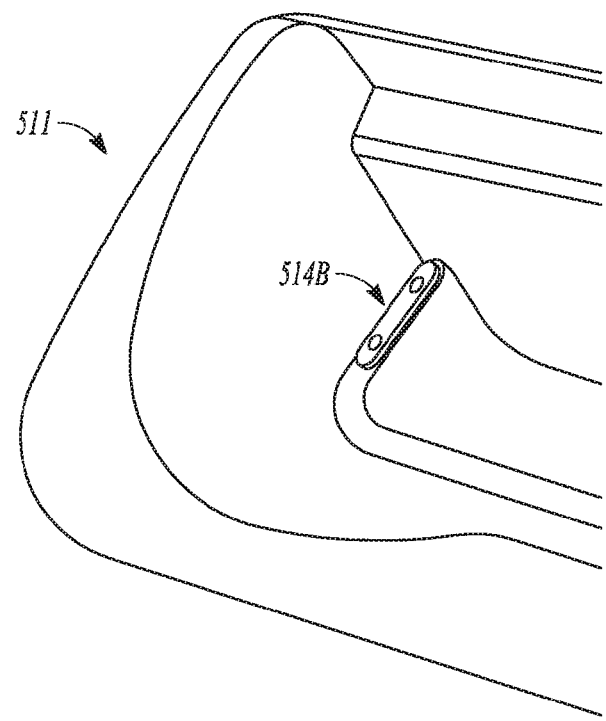
FIG. 6B an enlargement of an interior portion of a case from FIG. 6A illustrating an electronic connector can be used within the case, the electronic connector configured to mate with an electronic connector of the smart glasses according to an example embodiment.
Figure 6C:
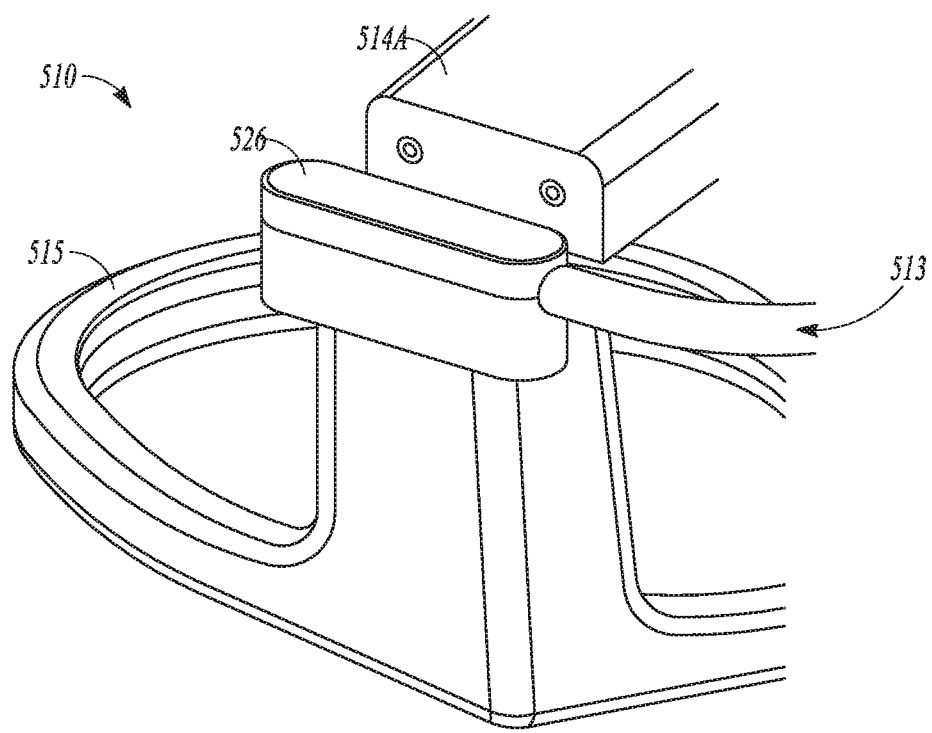
FIG. 6C is a perspective view of a cable coupled to a port of the smart glasses according to an example embodiment.
Figure 6D:
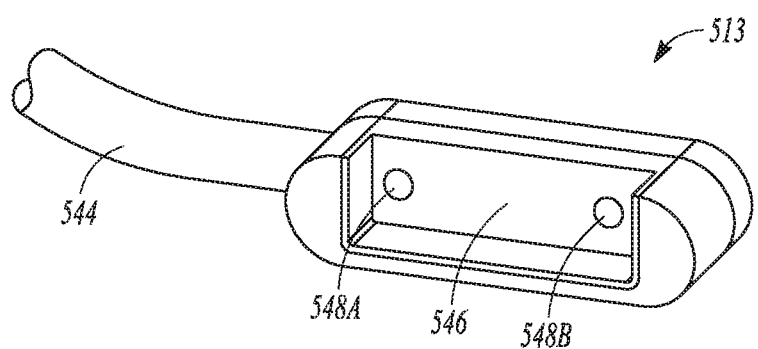
FIG. 6D is a perspective view of the cable that is part of the system of FIGS. 6A, 6B and 6C according to an example embodiment.

According to further aspects of this disclosure, the electronic connector of the temple can be configured to interface with and receive charge from an external power source (e.g., a case as shown in FIGS. 6A and 6B, a personal computer, or an outlet via a charger as shown in FIGS. 6C and 6D) when the eyewear article is in the collapsed configuration. The case or charger can be used for recharging of the battery of the smart glasses, for example. In some embodiments, these devices include electronic connector(s) that may include a data component for transmitting data signals, enabling information upload and/or download between the external source (e.g., a personal computer) and the smart glasses or between components of the smart glasses (e.g., the temple and the frame).

DETAILED DESCRIPTION

The description that follows includes apparatuses, systems, methods, and techniques that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter maybe practiced without these specific details. In general, well-known structures and techniques are not necessarily shown in detail.

Embodiments described herein relate to apparatuses, systems and methods that allow glasses (both conventional and smart) and other wearable objects to be more functional (e.g. slimmer, more portable, more easily and innocuously used) as well as more reliable, wearable and aesthetically pleasing. Certain embodiments described in detail herein include smart glasses and processes for their fabrication.

Regarding smart glasses, these may utilize one or more electronic connectors positioned between the temple and the frame such as adjacent an articulated joint there between. The electronic connector(s) may comprise any suitable connector configured for contact and coupling with a complementary connector to establish an electrical and/or electronic link, including for example a port, a link, a socket, a plug, a cord, a contact pin, a contact pad, micro-USB, or the like. Although referred to herein simply as an electronic connector, in some cases the electronic connector can facilitate the transfer of one or both of data and charge.

Regarding the construction of the smart glasses itself, according to one example the smart glasses have a lens-carrying frame and a pair of the temples coupled thereto on opposite ends of the frame at the articulated joint. For any one of the temples, the temples in the wearable configuration or mode when at least one of both temples are substantially fully unfolded for reception along a side of the user's head. In contrast, the temple(s) are in the collapsed configuration when at least one of the temples is hingedly folded towards the frame. Thus, the smart glasses can be in both the wearable configuration and the collapsed configuration at the same time (e.g., one temple unfolded the other temple folded towards the frame). According to further example embodiments, onboard electronics components, comprising at least a pair of electronics components carried by the frame and the temple respectively are disclosed. At least one of the pair of electronics components can include a battery. A battery carrier can be configured to carry the battery and rigidly mechanically connect to the articulated joint that couples the temple to the frame.

In some embodiments, the electronic connector extends across (e.g., is located at) the articulated hinge joint where one of the temples is hingedly connected or otherwise coupled to the frame. The electronic connector may be located on several of the joint faces provided by the frame and the temple respectively, the joint faces being in face-to-face abutment when in the wearable configuration (see e.g., FIG. 5B), and being in face-to-face abutment when in the collapsed configuration (see, e.g., FIG. 5A). To facilitate electronic transfer, the temple and the frame may carry cooperating features such as pins and pads configured for automatic contact and coupling when the smart glasses are in either the wearable configuration or the collapsed configuration. Such arrangements can provide for charge connection (and in some cases a data connection) between electronics in the temple and electronics in the frame.

This disclosure applies to both smart glasses (e.g., those have electronics carried thereby) and to conventional eyewear, and indeed, to other devices including wearable devices. Smart glasses includes electronics such as a power source, power and communication related circuitry, communication devices (e.g., a camera, a microphone, sensors, etc.), display devices, a computer, a memory, and/or the like. As used herein, conventional glasses make no use of electronics and are purely mechanical and optical in nature. Examples of conventional eyewear include prescription eyeglasses, sunglasses, and construction glasses.

FIG. 1 shows a plan view of a portion of a wearable device 10 such as glasses 12. The glasses 12 can include a temple 14, a frame 15 (illustrated in FIG. 1A), an articulated joint 16, and onboard electronics 18 such as a battery 20. According to the illustrated example, the glasses 12 additionally include a battery carrier 22. Together the battery 20 and the battery carrier 22 form a battery assembly 23. The temple 14 can include first and second electronic connectors 24A and 24B. According to the illustrated example, the articulated joint 16 (shown in dashed) comprises a hinge assembly 26 that includes hinge projections 28A and 28B. According to other embodiments, the articulated joint 16 can comprise a linkage assembly, a ball joint assembly, a male/female assembly, or another type of mechanical connection that allows for movement of the temple 14 relative to the frame 15 (FIG. 1A).

As shown in FIG. 1, the articulated joint 16 can be coupled to and/or formed as part of the temple 14. However, it should be noted that portions of the articulated joint 16 (e.g., longitudinal portions of the hinge projections 28A and 28B can extend into and are at least partially housed by the temple 14 and are rigidly mechanically connected to the battery carrier 22. This rigid mechanical connection is illustrated in FIG. 1 by overlap of the dashed box indicating articulated joint 16 with the dashed box indicating battery carrier 22 and is also indicated as interface 25 in FIG. 1. Such rigid mechanical connection (along with the relatively more rigid battery assembly 23) provides structural integrity to the temple 14 in that forces from the articulated joint 16 (forces from the glasses 12 being worn on the user's face and in hinging the temples 14 back and forth) are transferred directly to the battery carrier 22 with substantially little initial distribution to the body of the temple 14. From the battery carrier 22, these forces are eventually distributed over the relatively broader surface area of the battery carrier 22 to the temple 14.

As will be illustrated subsequently, the articulated joint 16 can also be formed as part of the frame 15 as well. Indeed, the articulated joint 16 is configured to provide for movement of the temple 14 relative to the frame 15. Thus, the articulated joint 16 allows for movement of the temple 14 such that it is disposable between a collapsed (folded) configuration and a wearable configuration (a configuration in which the device 10 is wearable by a user).

According to the illustrated example of FIG. 1, the temple 14 can be configured to house and carry onboard electronics 18 (e.g., the battery 20) and the battery carrier 22. The battery carrier 22 can be configured to house the battery 20 therein. As will be discussed and illustrated subsequently, various techniques and processes can be employed to configure the temple 14 to carry the battery 20 and the battery carrier 22 (and to have the battery carrier 22 house and carry the battery 20). Together the battery 20 and battery carrier 22 form the battery assembly 23. The battery assembly 23 can be longitudinally aligned along a longitudinal extent of the temple 14. As such, the battery assembly 23 can form a structural spine of the temple 14 for load bearing purposes. The battery carrier 22 can be formed of a more rigid material than the temple 14 such as a metal, metal alloy, or rigid plastic material. In contrast, the temple 14 can be constructed of a less rigid material than the battery carrier 22 such as a plastics material, cellulosic plastic (e.g., cellulosic acetate), an eco-plastic material, a thermoplastic material, or the like.

FIG. 1 illustrates a configuration where the articulated joint 16 is rigidly mechanically connected to the battery carrier 22 by mechanisms such as welding, adhesives, interlocking, for example. Thus, according to the illustrated example of FIG. 1, the hinge assembly 26 (in particular internal portions of the hinge projections 28A and 28B) can be welded to the battery carrier 22. Such rigid mechanical connection can facilitate force distribution in a more desirable manner as the hinge assembly 26 will need to bear weight and tension during wearing by a user (see previous discussion above). As such, securely attaching the hinge assembly 26 to a relatively rigid structure such as the battery carrier 22 (e.g. the battery carrier 22 can be formed of a stamped metal, metal alloy, or rigid plastic) can allow for force distribution from the hinge assembly 26 to the battery carrier 22 (and to the remainder of the temple 14) in a desirable manner. Thus, in some cases the temple 14 may not utilize a wire frame as is traditionally used with conventional glasses. Thus, the glasses 12 address structural integrity and reliability issues that can arise when cellulosic plastics, bioplastics, and other less rigid (but lightweight) materials are used to form the temple 14.

The first and second electronic connectors 24A and 24B can be disposed at or directly adjacent the articulated joint 16, for example along a face 30 of the temple 14 that interfaces with the frame 15 (FIG. 1A). Although illustrated as two electronic connectors 24A and 24B comprising pogo pins in FIG. 1, according to other examples a single electronic connector comprising another type of connection that facilitates power and/or data transfer to and from the onboard electronics 18 can be utilized. For example, the connector can comprise a port, a link, a socket, a plug, a cord, a contact pin, a contact pad, micro-USB, or the like. Although referred to herein generically as an electronic connector, in some cases the electronic connector can facilitate the transfer of only charge for the battery 20. According to other examples, the electronic connector(s) 24A and 24B can facilitate data transfer in addition to (or in alternative to) facilitating charging of the battery 20.

FIG. 1A illustrates an example of the glasses 12 with the temples 14A, 14B coupled to the frame 15 with one temple 14A shown in the collapsed position 32 and another temple 14B shown in the wearable position 34. In such example embodiment, the first and second electronic connectors 24A, 24B (FIG. 1) can be configured to interface and make electrical and physical contact with mating connectors 36A, 36B on the frame 15. Such contact can provide for power and/or data transfer between the onboard electronics 18 of the temple 14 and onboard electronics 38 of the frame 15. Such contact can occur with the temple 14 disposed in the wearable position 34 shown in FIG. 1A. In such position, the face 30 (FIG. 1) and the first and second electronic connectors 24A and 24B of can be substantially covered by an interfacing end face 40 of the frame 15.

In the collapsed position 32 show in FIG. 1A, the first and second electronic connectors of both the frame 15 and the temple 14 may be uncovered (e.g. electronic connector 36B is uncovered) and exposed by movement of the temple 14 relative to the frame 15. This movement uncouples (electrically disconnects and physically separates) the electronic connectors from one another and exposes one or both sets of electronic connectors to be physically and/or electrically coupled to another connection such as a cable connected to an external source of power, data, or power and data as will be discussed and illustrated subsequently.

According to the example of FIG. 1, the hinge assembly 26 can further include the hinge projections 28A and 28B, which correspond to, interface, and receive between one another one or more mating hinge projections of the frame in a conventional manner. Hinge projections 28A and 28B can be internally connected to the battery carrier 22 as described previously. Hinge projections 28A and 28B can be provided with apertures that can receive a pivot pin, for example. The pivot pin can be used to couple the hinge projections (including hinge projections 28A and 28B and projection(s) on frame) to allow for movement of the temple 14 in an articulating manner.

Figure 2A:
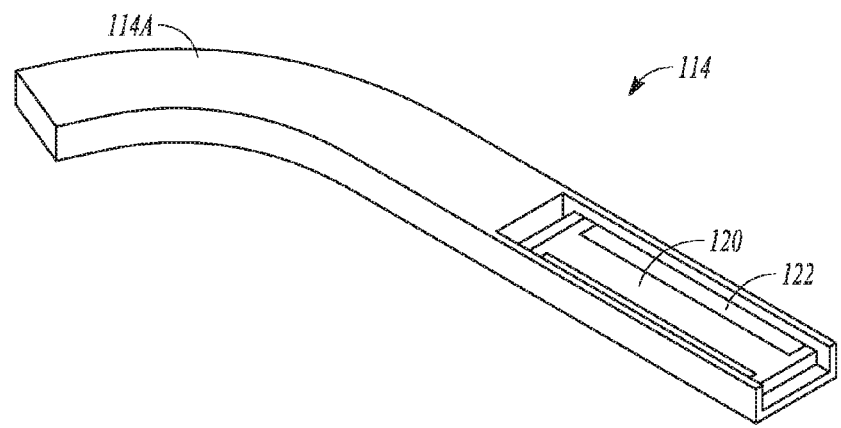
FIG. 2A is a perspective view of an assembly including a battery, a battery carrier, and a temple according to one embodiment.
Figure 2B:
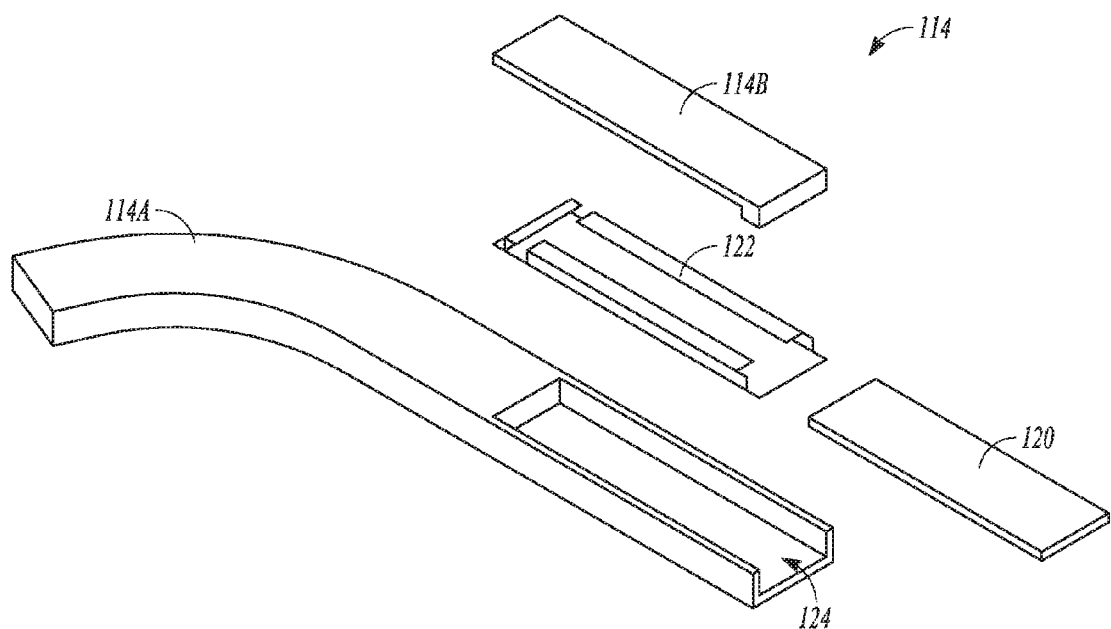
FIG. 2B is an exploded view of the assembly of FIG. 2A and further including a cover portion according to one embodiment.

FIG. 2A shows a portion of a temple 114 with an articulated joint portion removed to illustrate components carried by the temple 114. FIG. 2B shows an exploded view of the temple 114 including the components and further including a cover 114B. As illustrated in FIG. 2B, the temple 114 can include a base 114A and a cover 114B. The components carried by the temple 114 can include a battery 120 and a battery carrier 122.

As illustrated in FIG. 2A, the base 114A of the temple 114 can be configured to receive the battery 120 and the battery carrier 122 therein. The cover 114B (shown in FIG. 2B) can be configured to couple with the base 114A to enclose the battery 120 and the battery carrier 122 there between. Assembly of the temple 114, battery 120, and battery carrier 122 can include forming the battery carrier 122 into a shape configured to house the battery 120 therein and disposing of the battery 120 in the battery carrier 122. Such processes can include, for example, stamping the battery carrier 122 out of a thin metal or metal alloy (e.g. stainless steel). In some embodiments, the battery carrier 122 can be formed of a plastic material including, for example, an engineering plastic (polycarbonate, polyethylene terephthalate, polyamides, polyetheretherketone, polybutylene terephthalate, acrylonitrile butadiene styrene, etc.) and/or blends thereof. The material of the battery carrier 122 (e.g., stainless steel or plastic) can be selected to have a relatively higher rigidity than a material that forms the remainder of the temple 114. Thus, in some embodiments, the temple 114 (e.g. a body) can comprise a plastics material that is relatively lower in rigidity than the material of battery carrier 122. This construction (along with other factors including the secure mechanical coupling between components) allows the battery carrier 122 to be configured to form at least part of a structural framework of the temple 114. According to some embodiments, the battery carrier 122 can be plated or otherwise processed or configured to provide for electrical isolation of the battery 120 when housed within the battery carrier 122. Adhesive, such as a double-sided adhesive, can be used to secure the battery 120 within the battery carrier 122 in order to fix the location of the battery 120.

Assembling of the temple 114 to carry the battery carrier 122 and the battery 120 can additionally include machining the base 114A to form a cavity 124 (FIG. 2B) configured to receive the battery carrier 122 therein. Such machining can be accomplished by computer (or computerized) numerical control "CNC", for example. The battery carrier 122 and the battery 120 can be inserted into the cavity 124 to assemble the battery carrier 122 and the battery 120 to the base 114A.

According to further exemplary processes, the cover 114B can be machined or otherwise shaped as desired to cover the cavity 124 and couple with the base 114A. In some cases, the cover 114B can be formed with excessive material relative to the size of cavity 124 to facilitate thermal bonding between the base 114A and the cover 114B.

As discussed in reference to FIG. 1, a welding process or another process can be used in mechanically coupling the battery carrier 124 to an articulated joint (for example, articulated joint 16 of FIG. 1) between the temple 114 and the frame. An electrically conductive connection can be created between the battery and a first connector (e.g. electronic connector 24A of FIG. 1) that is configured to electrically connect the battery to the onboard electronics components of the frame across the articulated joint between the temple and the frame. Such process can be accomplished by wire soldering for example. The cover 114B can be bonded to the base 114A by thermal or other methods. According to further embodiments, a polishing process can be used to remove any seams between the base 114A and the cover 114B.

Figure 3A:
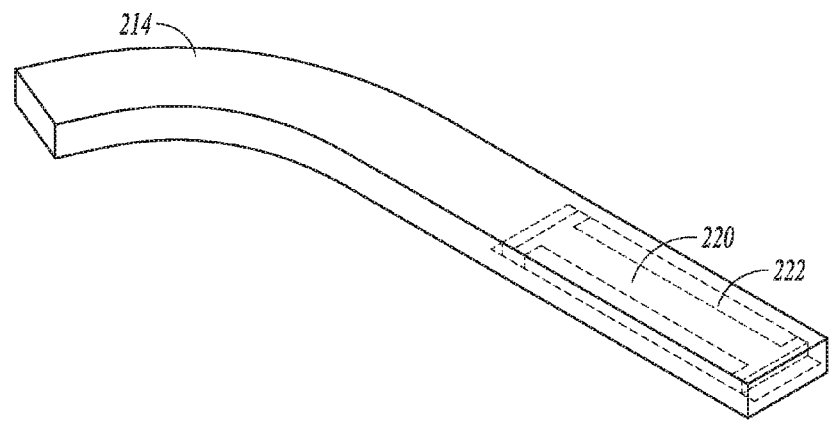
FIG. 3A is perspective view of another embodiment of the assembly including a temple, a battery carrier, and a battery according to one embodiment.
Figure 3B:
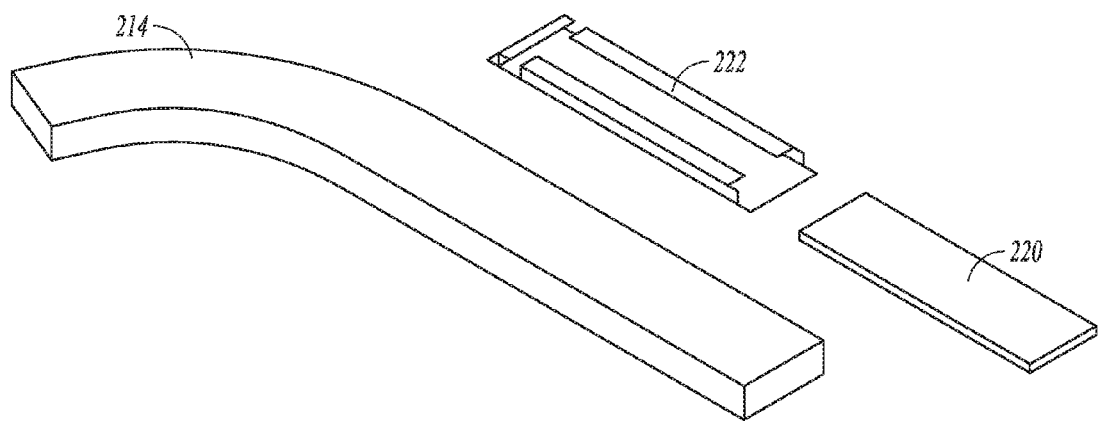
FIG. 3B is an exploded view of the assembly of FIG. 3A according to one embodiment.

FIGS. 3A and 3B show a temple 214 according to another example embodiment. This embodiment can include a battery 220 and a battery carrier 222. As shown in FIG. 3A, the battery 220 and battery carrier 222 can be embedded within the temple 214. Unlike the temple 114 of FIGS. 2A and 2B, the temple 214 is not initially divided into a base and cover. Assembling of the temple 214 can include techniques and methods similar to those previously described in reference to the temple 114 of FIGS. 2A and 2B. However, certain techniques, methods, and/or resulting structures can be altered.

Assembly of the temple 214, battery 220, and battery carrier 222 can include forming the battery carrier 222 into a shape configured to house the battery 220 therein and disposing of the battery 220 in the battery carrier 222. Such processes can include, for example, stamping the battery carrier 222 out of a thin metal or metal alloy (e.g. stainless steel). The battery carrier 222 can also be constructed of plastics material and can be configured to form at least part of a structural framework of the temple 214 as previously described. According to some embodiments, the battery carrier 222 can be plated or otherwise processed or configured to provide for electrical isolation of the battery 220 when housed within the battery carrier 222. Adhesive, such as a double-sided adhesive, can be used to secure the battery 220 within the battery carrier 222 in order to fix the location of the battery 220.

According to the example of FIGS. 3A and 3B, the assembly of the temple 214 can include molding to form the temple 214 around the battery carrier 222 and the battery 220. For example, the battery 220 and battery carrier 222 can be loaded into an injection molding tool and plastic or another material can be injected around the battery 220 and battery carrier 222 to form the temple 214 in a desired shape. According to further embodiments, a polishing process can be used to remove excess or unwanted material to further shape the temple 214 as desired.

Figure 4:
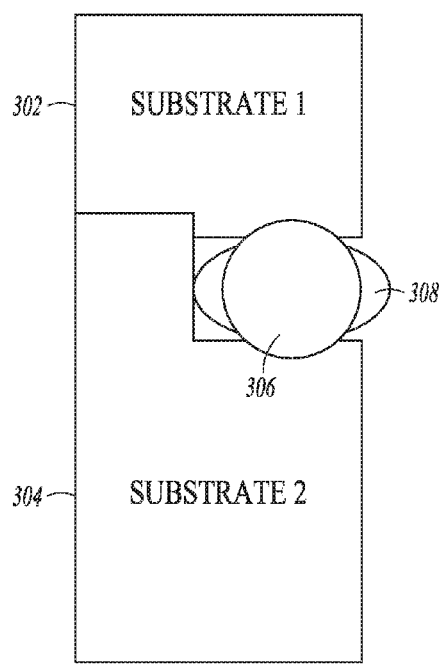
FIG. 4 shows an arrangement including at least two substrates coupled together according to one embodiment.

FIG. 4 provides an example of an arrangement and processes that can be utilized with the wearable devices disclosed herein. For example, the processes of FIG. 4 can be used to mechanically couple the battery carrier to the articulated joint or to mechanically couple other components of the smart glasses together. FIG. 4 additionally has applicability to other devices both electronic and conventional (devices not carrying electronic components). Use of the arrangement and techniques described in FIG. 4 can be used in applications where space is highly constrained. Such applications can include the fabrication of wearable devices, for example.

FIG. 4 shows an arrangement of two substrates 302 and 304 coupled together by the use of adhesive(s) and welding process such as ultra-sonic welding. In particular, FIG. 4 shows a blend or mixture of a ball 306 with an adhesive 308 such that the ball 306 and the adhesive 308 are disposed in substantially a same relative location between the two substrates 302, 304. According to some examples, the ball 306 can comprise a plastic, a resin, or a glass, or a combination thereof. The adhesive 308 can comprise a material such as an epoxy. The blend of the ball 306 with the adhesive 308 allows the ball 306 to be melted by ultra-sonic welding to provide for a bonding media between the two substrates 302, 304. The adhesive 308 is then located at and between this bonding media. According to further embodiments, the two substrates 302 and 304 can differ in composition such that they have different melting temperatures and/or are of an incompatible chemical structure for surface fusion. In such cases, the balls used in facilitating bonding of the two substrates 302 and 304 can comprise two or more different types of balls (e.g., two different types of resin balls) each type of ball can have a different chemical composition from the other type(s) of balls. At least one of the two or more different types of balls can be compatible with the first substrate 302 such that an improved bond can be formed therebetween (e.g., with an ultra-sonic welding process). Similarly, at least a second of the two or more different types of balls can be compatible with the second substrate 304 such that an improved bond can be formed therebetween (e.g., with an ultra-sonic welding process). The two or more types of balls can be disposed linearly (with adhesive) along an interface between the substrates 302 and 304 in an alternating pattern, for example.

Thus, FIG. 4 illustrates an assembly of a first substrate, a second substrate, and a bead/adhesive blend. The bead/adhesive blend comprises one or more of a plastic, glass or resin disposed within an adhesive. The bead/adhesive blend is configured to form a bonding media between the first substrate and the second substrate. The bead/adhesive blend can be placed along a single location (interface) between the first substrate and the second substrate according to some examples. In some examples, the beads the two or more different types of balls each type of ball can have a different chemical composition from the other type(s) of balls.

In further aspects, a method is described providing a first substrate and a second substrate. A blend comprising one or more beads and an adhesive is applied between the first substrate and the second substrate. The beads are applied within the adhesive along substantially a same interface between the first substrate and the second substrate. The method can include ultra-sonic vibration of the first substrate and/or second substrate to melt the beads to form a bonding media between the first substrate and the second substrate. The beads can comprise one or more of a plastic, a glass, or a resin.

The arrangement of FIG. 4 allows for reduced amount of space in bonding the substrates 302, 304 together, thereby reducing form factor. Conventional techniques separate glass beads from adhesive so as to place them along a different separate surface(s) between the substrate. Using separated beads from adhesive (e.g., on two separate bonding media) can increase the amount of spaced needed in bonding, and thereby, increase form factor.

FIGS. 5A and 5B are schematics of glasses 410 that incorporate various aspects of the eyewear previously discussed but may differ therefrom. For example, the glasses 410 can be configured to electrically couple in a first position (e.g., the wearable position 34 as shown in FIG. 1A) and a second position (e.g., the collapsed position 32 as shown in FIG. 1A). The glasses 410 can be constructed in a manner similar to those previously discussed, and thus, can include two temples (only one temple 414 is illustrated in FIGS. 6A and 6B) and a frame 415. However, electronic connectors 424A, 424B and articulated joint 416 of the glasses 410 can differ from those previously discussed with regard to specific embodiments of FIGS. 1-3B. According to the embodiment illustrated in FIGS. 5A and 5B, the glasses 410 comprise smart glasses which carry onboard electronics 418.

The frame 415 and temple 414 can be provided with complimentary electronic connectors 424A, 424B configured to electrically and physically couple with one another as generally illustrated. The electronic connectors 424A, 424B can be disposed adjacent the articulated joint 416 or can be incorporated into the articulated joint 416. In some cases, the electronic connectors 424A, 424B can be disposed at other portions of the frame 415 and temple 414 from the locations previously discussed.

The smart glasses 410 of FIGS. 5A and 5B can include various onboard electronics 418. For example, the temple 414 can be configured to carry and/or house a battery 420 and a circuit 430, such as a protection circuit, in addition to the electronic connectors 424A and any other devices (e.g. a battery carrier). The battery 420 is configured to operationally store charge. The circuit 430 is coupled to the battery 420 (and to the electronic connector 424A) and is configured to deliver the charge to and from the battery 420.

The frame 415 can be configured to carry and/or house further electronics 450 such as a computer 452, a memory 454 (e.g., flash storage), a display 456 (e.g., LCD, LED, and the like), a sensor 458, a camera/microphone 460, a capture device 462 (e.g., a button), and a wireless module 464. Although not illustrated, the temple 414 and/or frame 415 can carry further electronics 450 in some instances such as further sensors, ancillary batteries, peripheral devices or other peripherals.

Many if not all of the electronics 450 run software and perform other tasks that require electrical charge from the battery 420. Thus, the ability to provide charge from the battery 420 to the electronics 450 carried by the frame 415 when the glasses are in the collapsed position of FIG. 5A (in addition to the wearable position of FIG. 5B) allows software and/or tasks to be performed even when the glasses are stowed. Therefore, performance of the glasses 410 and user experience can be improved as software can run and tasks can be performed even when the glasses are stowed. According to some examples, moving the temple 414 to the folded position of FIG. 5A can put the electronics 450 in low power mode of operation where sufficient power is provided to the electronics 450 such that software and other tasks can be performed by one or more of the electronic devices but excessive power is not utilized. Thus, battery life can be preserved even as software and tasks are performed when the glasses 410 are in the folded position.

As shown in FIGS. 5A and 5B, the connectors 424A and 424B are configured to interface and couple together to form conductive coupling capable of passing electrical charge. The computer 452 can be of any suitable type (e.g., make use of a low-power circuitry, high-speed circuitry, and/or a display processor) to be carried by the frame 415 and can communicate with the other electronics 450. The computer 452 can include one or more processors with memory, wireless communication modules and circuitry, a power source, and the like. Additional details of aspects of computer 452 may be implemented with use of the display 456, the sensor 458, the camera/microphone 460, the capture device 462 (e.g., a button), and/or other components or peripherals. Further aspects of the computer 452 may be implemented remotely via wireless, bluetooth, or the like.

Although described as a signal unit the camera/microphone 460 can comprise separate components or can be only a camera or only a microphone. The camera/microphone 460 can comprise multiple cameras and/or multiple microphones in some instances. The computer can be configured to communicate with and/or control various of the electronics 450 such as the display 456, the sensor 458, the capture device 462, the wireless module 464 and/or other peripheral devices. The electronics 450 can additionally include a video processor (not shown) such as a microprocessor integrated circuit (IC) customized for processing sensor data from the camera/microphone 460, along with volatile memory used by the microprocessor to operate. The memory 454 can comprise any suitable storage device capable of storing data generated by the electronics 450 including the camera/microphone 460. Memory can be integrated with high-speed circuitry, can be an independent standalone element, or can be remote or integrated into the glasses 410.

According to a further example, any of the glasses previously described can be used as part of a system such as system 510. The system 510 can include a case 511, glasses 512, and a cable 513, for example, as illustrated in FIGS. 6A to 6D. As discussed with regard to previous embodiments, the glasses 512 (FIG. 6A) can generally include a frame 515, temples 514A and 514B, and electronics (as illustrated and discussed in previous embodiments); the details of each will not be discussed in great detail as aspects of these items have been previously described.

The case 511 can comprise a container or holder for the glasses 512 as illustrated in FIG. 6A. The case 511 and glasses 512 can include complementary electronic connectors 524 (FIG. 6B). One such electronic connector 524 can comprise a base or internal connector or port on the case 511 and a corresponding connector (not shown but previously discussed) on the glasses 512.

As illustrated variously in FIGS. 6A to 6D, the glasses 512, the case 511 and the cable 513 (having external electronic connector 526 of FIG. 6C) can interact together in various ways and for various purposes. For example, the case 511 can be used to transport and protect the glasses 512, to charge or provide power to the electronics (including the battery housed in the temple 514A) incorporated in the glasses 512, and/or to communicate with the electronics of the glasses 512. Thus, in some embodiments the case 511 can house a supplemental battery to those of the glasses 512. Thus, the case 511 can be an external source of power for the glasses 512.

The internal connector 524 of the case 511 is configured to couple to a corresponding electronic connector of the glasses 512 in a manner previously described for power and/or data communication when the temples 514A and 514B are in the collapsed position and docked in the case 511. As such, the interior of the case 511 can be shaped to receive the glasses 510 only when the temples 514A and 514B are in the collapsed position. The shape of the interior also can be such that the electronic connector (e.g., electronic connectors 24A, 24B) of the glasses 512 interfaces directly with the internal electronic connector 524 when the glasses 512 are docked in the case 511 with little slippage or movement occurring between the case 511 and the glasses 512. Although illustrated as pogo pin/pad connectors, the connectors can be of virtually any type known in the art for power and/or data communication such as micro-USB, or the like.

FIG. 6C shows the end portion of the cable 513 as well as the temple 514A and a portion of the frame 515. The cable 513 can include an electronic connection portion 526 that is configured for coupling with electronic connector(s) of either the temple 514A and/or frame 515. The cable 513 can be electrically coupled to an external power source. Such electrical coupling can occur when the temple 514A is in the collapsed condition. The external power source can comprise a personal computer, an electrical outlet connected to the power grid, or another battery powered device, for example. The electronic connection portion 526 can be configured to mount on either one of the temple 514A or frame 515 and is configured to interface with and couple to the electronic connectors therealong to allow the external power source to charge a battery, for example.

FIG. 6D provides an example of the cable 513, which includes a cord 544, a charging face 546, and pads 548A and 548B. In the example embodiment of FIG. 6D, the charging face 546 is recessed to facilitate mounting to an edge of the temple 514 or the frame 515. The pads 548A and 548B are configured to be complementary to pins or other type of connection used on the glasses 512 between the temple 514A and the frame 515. In other embodiments, the pads 548A and 548B can be another connector type designed to be complimentary to the connector type used by the glasses 512. Cord 544 can be configured with a plug, USB or the like on a second end (not shown) to couple with an external power source (or data source) such as a personal computer or outlet.

Apparatuses, systems and methods for wearable devices such as smart glasses are described. According to one embodiment, the wearable device can include a frame, a temple, onboard electronics including a battery, and a battery carrier. The frame is frame configured to hold one or more optical elements. The temple is connected to the frame at an articulated joint such that the temple is disposable between a collapsed condition and a wearable condition in which the device is wearable by a user to hold the one or more optical elements within user view. The onboard electronics components comprise at least a pair of electronics components carried by the frame and the temple respectively. At least one of the pair of electronics components comprising the battery. The battery carrier is configured to house the battery therein and is carried by one of the temple and the frame. The battery carrier is rigidly mechanically connected to the articulated joint.

According to another embodiment, a method of forming wearable device is disclosed. The method includes forming a battery carrier configured to house a battery therein, disposing a battery in the battery carrier, providing at least a first portion of the wearable device configured to carry onboard electronics components, assembling at least a second portion of the wearable device to carry the battery carrier and the battery, and mechanically coupling the battery carrier to an articulated joint between the first portion and the second portion.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of forming a wearable device comprising:
mounting a battery on a rigid battery carrier to form a battery assembly;
forming a first component of the device by housing the battery assembly in a body of a plastics material that is relatively lower in rigidity than a material of battery carrier, so that the battery assembly is configured to form at least part of a structural framework of the first component; and
connecting together the first component to a second component at an articulated joint, the battery assembly being secured to the articulated joint by a rigid mechanical connection formed at least, in part within a body of the first device component, the second component being configured to carry onboard electronics to be powered by the battery.

2. The method of claim 1, wherein forming the first component comprises:
machining a base to form a cavity therein;
inserting the battery assembly into the cavity; and
machining a cover separate from the base and configured to thermally mate therewith.

3. The method of claim 2, wherein forming the first component further includes thermally bonding the cover to the base to enclose the battery and the battery carrier.

4. The method of claim 3, wherein forming the first component further includes polishing the second portion to remove a seam between the base and the cover.

5. The method of claim 1, further comprising disposing the battery in the battery carrier by affixing the battery to the battery carrier with an adhesive.

6. The method of claim 1, further comprising plating the battery carrier to provide for electrical insulation of the battery.

7. The method of claim 1, wherein the wearable device comprises smart glasses and the first component comprises a temple and the second component comprises a frame.

8. The method of claim 1, wherein forming the first component comprises molding to form the first component portion around the battery carrier and the battery to enclose the battery and battery carrier therein.

9. The method of claim 1, further comprising creating an electrically conductive connection between the battery and a first electronic connector that is configured to electrically connect the battery to the onboard electronics across the articulated joint between the first component and the second component.

10. The method of claim 1, wherein the articulated joint comprises a hinge assembly and the rigid mechanical connection comprises a weld between the battery carrier to the hinge assembly.

11. A temple assembly forming part of wearable electronic glasses, the assembly comprising:
a temple mechanical connection configured to form an articulated joint at a first longitudinal end portion thereof with a frame of the wearable electronic glasses;
a battery carrier rigidly attached to the temple mechanical connection at a second longitudinal end portion thereof;
a battery mounted on the battery carrier; and
a temple body comprising a plastics material, the temple body configured to house the battery and battery carrier and interface with the second longitudinal end portion of the temple mechanical connection, wherein the battery and battery carrier are generally longitudinally aligned along a longitudinal extent of the temple body and are configured to form at least part of a structural framework for the temple body.

12. The wearable device of claim 11, wherein the frame is configured to carry onboard electronics components powered by the battery.

13. The wearable device of claim 12, wherein the temple body is configured with at least a first electronic connector that is configured to electrically connect the battery to the onboard electronics components across the articulated joint between the temple body and the frame.

14. The wearable device of claim 11, wherein the battery and the battery carrier are imbedded and totally encased within the temple body.

15. The wearable device of claim 11, wherein the temple body comprises at least one of a plastics material, cellulosic plastic material, cellulosic acetate, an eco-plastics material, or a thermoplastics material that is less rigid than a material of the battery carrier.

16. The wearable device of claim 11, wherein the temple mechanical connection comprises a hinge assembly that is welded to the battery carrier.

17. A wearable electronic device comprising:
a frame configured to hold one or more optical elements,
a temple body connected to the frame at an articulated joint such that the temple body is disposable between a collapsed condition and a wearable condition in which the device is wearable by a user to hold the one or more optical elements within user view;
one or more onboard electronics components carried by the frame and the temple body; and
a battery assembly at least partially housed within the temple body, the battery assembly including a battery mounted on a battery carrier, the battery assembly configured to form at least part of a structural framework for the temple body and being rigidly attached to a portion of the articulated joint.

18. The wearable device of claim 17, wherein the temple body is configured with at least a first electronic connector that is configured to electrically connect the battery to onboard electronics components carried by the frame across the articulated joint between the temple body and the frame.

19. The wearable device of claim 17, wherein the articulated joint comprises a hinge assembly that is welded to the battery carrier.

20. The wearable device of claim 17, wherein the temple body comprises at least one of a plastics material, cellulosic plastic material, cellulosic acetate, an eco-plastics material, or a thermoplastics material that is less rigid than a material of the battery carrier, and wherein the battery assembly is generally longitudinally aligned along a longitudinal extent of the temple body.

* * * * *